United States Patent
Bielinski et al.

(10) Patent No.: US 10,158,544 B2
(45) Date of Patent: Dec. 18, 2018

(54) SELECTING COMMUNICATION CHANNELS BASED ON CATEGORIZATIONS AND MEASUREMENTS

(71) Applicant: International Business Machines Corporation, Armonk, NY (US)

(72) Inventors: Marcin Bielinski, Cracow (PL); Tymoteusz Gedliczka, Cracow (PL); Jakub Rzeznik, Cracow (PL); Bartosz Tomasik, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 407 days.

(21) Appl. No.: 14/970,666

(22) Filed: Dec. 16, 2015

(65) Prior Publication Data
US 2017/0180228 A1    Jun. 22, 2017

(51) Int. Cl.
H04L 12/26    (2006.01)
H04L 12/24    (2006.01)

(52) U.S. Cl.
CPC ........ H04L 43/0864 (2013.01); H04L 43/026 (2013.01); H04L 43/14 (2013.01); *H04L 41/5019* (2013.01); *Y02D 50/30* (2018.01)

(58) Field of Classification Search
CPC .............. H04L 41/5019; H04L 43/026; H04L 43/0864; H04L 43/14
USPC ......................................................... 370/252
See application file for complete search history.

(56) References Cited

U.S. PATENT DOCUMENTS

| 5,504,928 A * | 4/1996 | Cook .................... G06F 13/105 703/26 |
| 8,027,293 B2 | 9/2011 | Spaur et al. |
| 8,578,024 B1 * | 11/2013 | Keralapura ........... H04L 43/026 709/224 |
| 8,812,742 B2 * | 8/2014 | Flanagan ............ G06F 13/4022 455/456.2 |

(Continued)

OTHER PUBLICATIONS

Cisco, "Enhanced Interior Gateway Routing Protocol," Cisco Technology White Paper, Last Modified Jan. 5, 2015, 50 Pages, Document ID 16406.

(Continued)

*Primary Examiner* — Omar J Ghowrwal
*Assistant Examiner* — Kokou R Detse
(74) *Attorney, Agent, or Firm* — Erik K. Johnson; Robert C. Bunker

(57) ABSTRACT

A method for selecting at least one communication channel based on a plurality of communication channel characteristics is provided. The method may include receiving a plurality of communications. The method may further include separating the received plurality of communications into a plurality of units. Additionally, the method may include categorizing the plurality of units based on a number of commands associated with the plurality of units. The method may also include measuring a plurality of communication channels based on the categorized plurality of units, the number of commands, and the plurality of communication channel characteristics. The method may further include selecting the at least one communication channel associated with the measured plurality of communication channels to process at least one unit associated with the categorized plurality of units.

17 Claims, 6 Drawing Sheets

(56) References Cited

U.S. PATENT DOCUMENTS

2010/0157829 A1\* 6/2010 Jonsson ................ H04L 1/0026
370/252
2013/0139169 A1\* 5/2013 Prabhakar ............. G06F 9/4893
718/104

OTHER PUBLICATIONS

Mell et al., "The NIST Definition of Cloud Computing," National Institute of Standards and Technology, Sep. 2011, p. 1-3, Special Publication 800-145.

\* cited by examiner

SELECTING COMMUNICATION CHANNELS BASED ON CATEGORIZATIONS AND MEASUREMENTS

BACKGROUND

The present invention relates generally to the field of computing, and more specifically, to communication channels.

Generally, communication channels may be used to transfer information, such as digital bit streams, from one or more senders to one or one receivers. Furthermore, for two or more computers, such as a server and a target, there may be different communication channels available. Specifically, the different communications channels may be selected to transmit information based on communication characteristics. For example, communication channels may have certain capacities for transmitting information that are typically measured by speed and distance, such as bandwidth in Hz and/or by data rate in bits per second. Generally, optimal communication channel selection is needed to provide optimal delivery experience to customers.

SUMMARY

A method for selecting at least one communication channel based on a plurality of communication channel characteristics is provided. The method may include receiving a plurality of communications. The method may further include separating the received plurality of communications into a plurality of units. Additionally, the method may include categorizing the plurality of units based on a number of commands associated with the plurality of units. The method may also include measuring a plurality of communication channels based on the categorized plurality of units, the number of commands, and the plurality of communication channel characteristics. The method may further include selecting the at least one communication channel associated with the measured plurality of communication channels to process at least one unit associated with the categorized plurality of units.

A computer system for selecting at least one communication channel based on a plurality of communication channel characteristics is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include receiving a plurality of communications. The method may further include separating the received plurality of communications into a plurality of units. Additionally, the method may include categorizing the plurality of units based on a number of commands associated with the plurality of units. The method may also include measuring a plurality of communication channels based on the categorized plurality of units, the number of commands, and the plurality of communication channel characteristics. The method may further include selecting the at least one communication channel associated with the measured plurality of communication channels to process at least one unit associated with the categorized plurality of units.

A computer program product for selecting at least one communication channel based on a plurality of communication channel characteristics is provided. The computer program product may include one or more computer-readable storage devices and program instructions stored on at least one of the one or more tangible storage devices, the program instructions executable by a processor. The computer program product may include program instructions to receive a plurality of communications. The computer program product may also include program instructions to separate the received plurality of communications into a plurality of units. Additionally, the computer program product may further include program instructions to categorize the plurality of units based on a number of commands associated with the plurality of units. The computer program product may also include program instructions to measure a plurality of communication channels based on the categorized plurality of units, the number of commands, and the plurality of communication channel characteristics. The computer program product may further include program instructions to select the at least one communication channel associated with the measured plurality of communication channels to process at least one unit associated with the categorized plurality of units.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
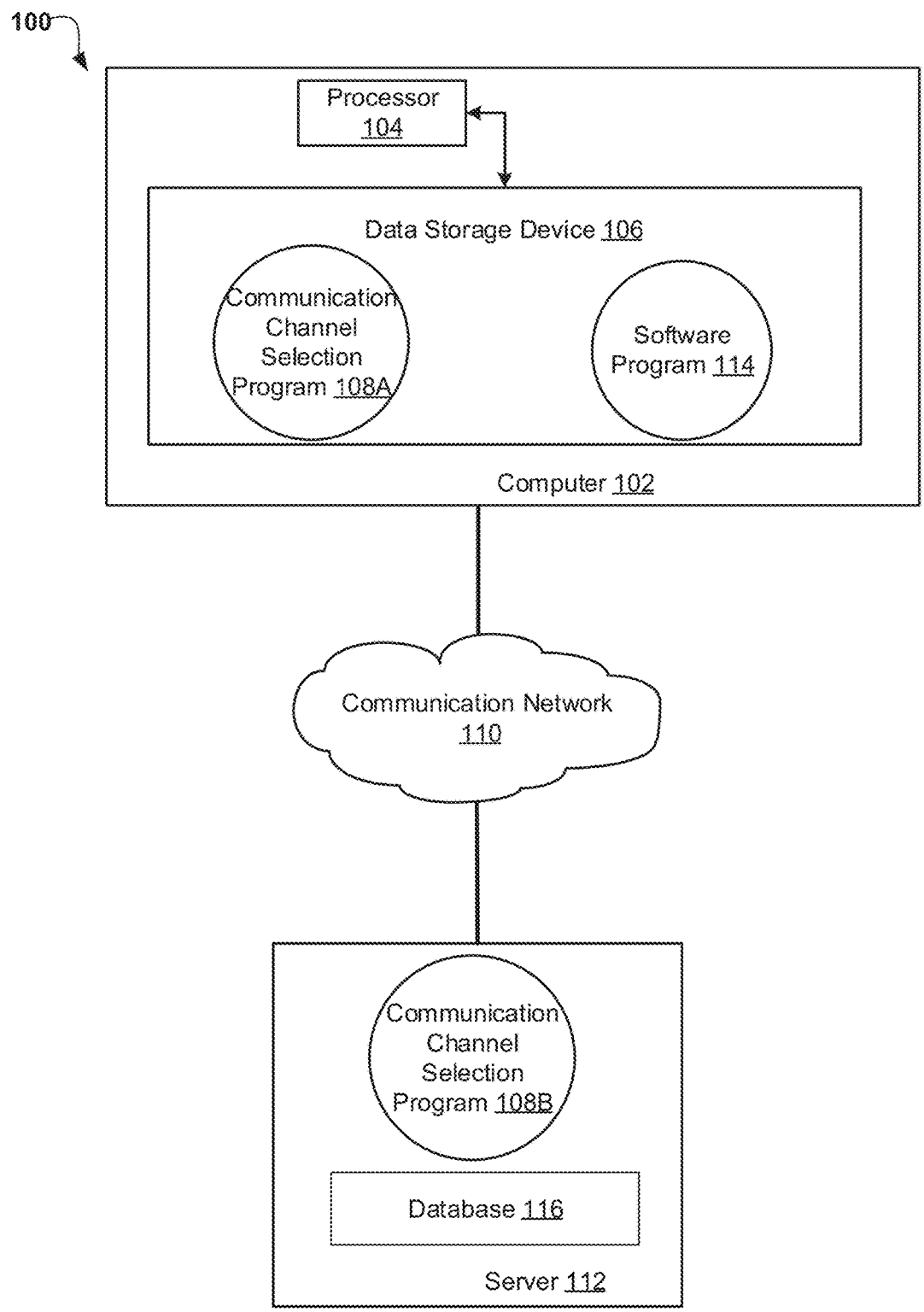
FIG. 1 illustrates a networked computer environment according to one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate generally to the field of computing, and more particularly, to communication channels. The following described exemplary embodiments provide a system, method and program product for selecting communication channels based on communication channel characteristics. Therefore, the present embodiment has the capacity to improve the technical field associated with selecting communication channels by measuring communication channel characteristics. Specifically, the present embodiment may separate communications associated with communication channels into logical units and categorize the communications as single command or multi command, then the communication channels may be measured and selected based on characteristics associated with the communications and the different communication channels.

As previously described with respect to communication channels, different communication channels may be used to transfer information. Specifically, the different communications channels may be selected to transmit information based on communication characteristics. However, the selection of the different communication channels is typically based on the speed and distance it takes to transmit the information between two or more computers and does not account for additional communication channel characteristics. As such, it may be advantageous, among other things, to provide a system, method and program product for selecting communication channels based on different communication channel characteristics. Specifically, communications associated with communication channels may be separated into logical units and categorized as single command or multi command, then the communication channels may be measured and selected based on characteristics associated with the communications and the different communication channels.

According to at least one implementation of the present embodiment, communications may be received. Then, the communications may be separated into logical units. Next, the communication logical units may be categorized. Then, based on characteristics associated with the categorized communication logical units and communication channels, communication channels may be measured. Thereafter, based on the measurements, communication channels may be selected.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for selecting communication channels based on communication channel characteristics.

According to at least one implementation, communications may be received. Then, the communications may be separated into logical units. Next, the communication logical units may be categorized. Then, based on characteristics associated with the categorized communication logical units and communication channels, communication channels may be measured. Thereafter, based on the measurements, communication channels may be selected.

Referring now to FIG. 1, an exemplary networked computer environment 100 in accordance with one embodiment is depicted. The networked computer environment 100 may include a computer 102 with a processor 104 and a data storage device 106 that is enabled to run a communication channel selection program 108A and a software program 114. The software program 114 may be an application program such as an internet browser and an email program. The communication channel selection program 108A may communicate with the software program 114. The networked computer environment 100 may also include a server 112 that is enabled to run a communication channel selection program 108B and a communication network 110. The networked computer environment 100 may include a plurality of computers 102 and servers 112, only one of which is shown for illustrative brevity.

According to at least one implementation, the present embodiment may also include a database 116, which may be running on server 112. The communication network may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with server computer 112 via the communications network 110. The communications network 110 may include connections, such as wire, wireless communication links, or fiber optic cables. As will be discussed with reference to FIG. 4, server computer 112 may include internal components 800a and external components 900a, respectively, and client computer 102 may include internal components 800b and external components 900b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing device capable of running a program and accessing a network. According to various implementations of the present embodiment, the communication channel selection program 108A, 108B may interact with a database 116 that may be embedded in various storage devices, such as, but not limited to a mobile device 102, a networked server 112, or a cloud storage service.

According to the present embodiment, a program, such as a communication channel selection program 108A and 108B may run on the client computer 102 or on the server computer 112 via a communications network 110. The communication channel selection program 108A, 108B may select communication channels based on measured communication channel characteristics. Specifically, a user using a computer, such as computer 102, may run a communication channel selection program 108A, 108B, that interacts with a software program 114, such as Firefox® (Firefox and all Firefox-based trademarks and logos are trademarks or registered trademarks of Firefox and/or its affiliates) to separate communications associated with communication channels into logical units and categorize the communications as single command or multi command, then the communication channels may be measured and selected based on characteristics associated with the communications and the different communication channels.

Figure 2:
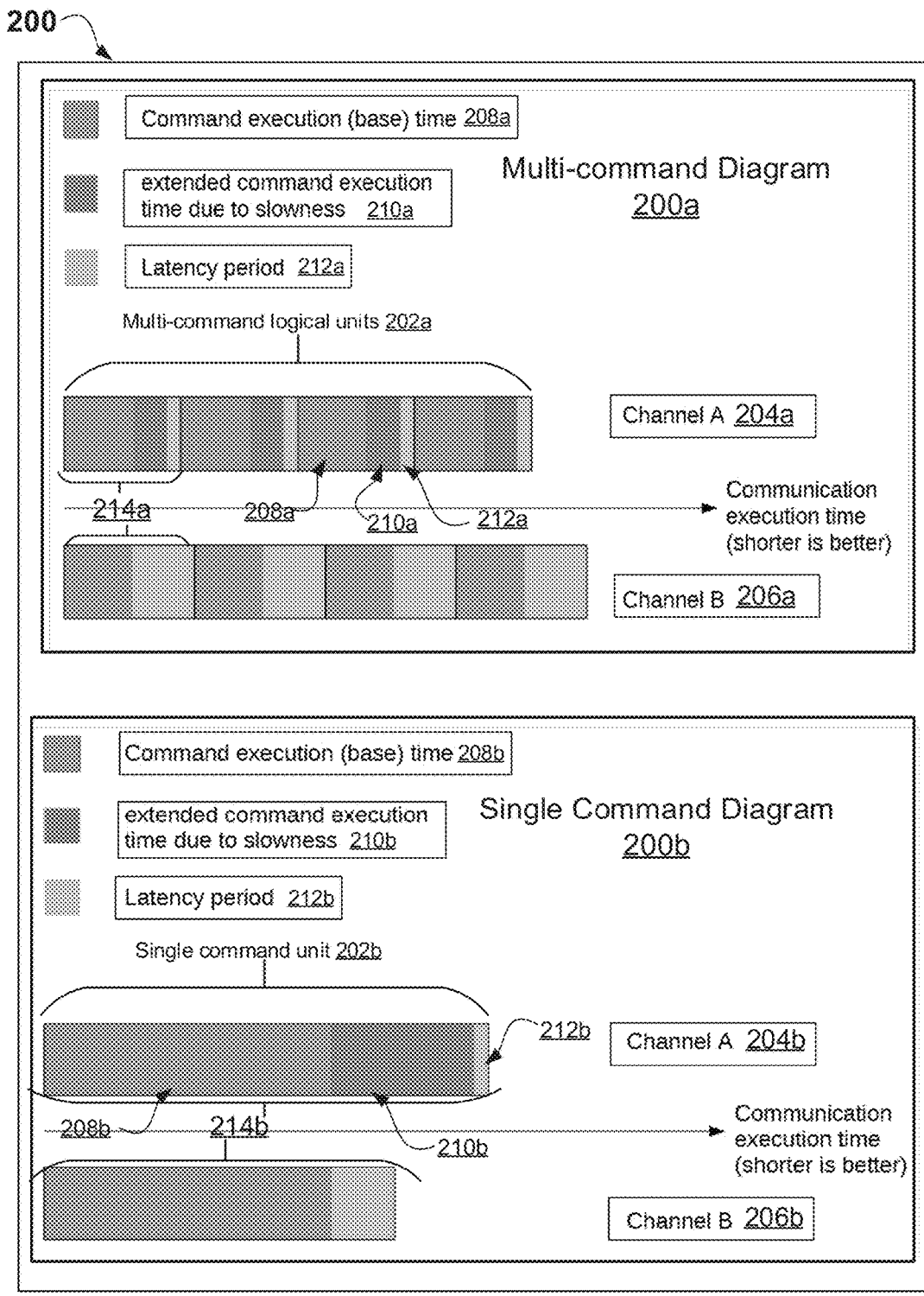
FIG. 2 is an example of communication channel selection diagrams according to one embodiment.

Referring now to FIG. 2, an example 200 of communication channel selection diagrams 200a and 200b according to one embodiment are depicted. As previously described in FIG. 1, the communication channel selection program 108A, 108B (FIG. 1) may separate communications associated with communication channels 204a, 204b, 206a, and 206b into logical units 214a, 214b, categorize the communications as single command units 202b or multi-command units 202a, then the communication channels 204a, 204b, 206a, and 206b may be measured and selected based on characteristics associated with the communications and the different communication channels 204a, 204b, 206a, and 206b.

Specifically, according to one embodiment, the communication channel selection program 108A, 108B (FIG. 1) may measure the communication channels 204a, 204b, 206a, and 206b based on the expression y=a*(x+b), whereby: y=the time required to process a communication logical unit 214a, 214b; x=the average time to run a single command on a computer depending on information such as the target computer processing power; b=round-trip latency between computers; and a=the number of commands to be processed based on whether synchronous and asynchronous communication channels.

For example, and as previously described, the communication channel selection program 108A, 108B (FIG. 1) may receive communications and separate the communications into logical units 214a, 214b. Specifically, the communication logical units 214a, 214b may include a command execution base time 208a, 208b, or the time it takes to process multi-command logical units 202a or single command logical units 202b without additional considerations, an extended command execution time due to slowness 210a, 210b, and a latency period 212a, 212b. Thereafter, the communication channel selection program 108A, 108B (FIG. 1) may categorize the communication logical units 214a, 214b as multi-command logical units 202a or single command logical units 202b. Then, based on the categorization, the communication channel selection program 108A, 108B (FIG. 1) may measure communication channels 204a, 204b, 206a, and 206b to determine the optimal communication channel 204a, 204b, 206a, and 206b for the communications.

For example, the communication channel selection program 108A, 108B (FIG. 1) may receive communications, separate the communications into logical units 214a, 214b, and categorize the communication logical units 214a, 214b as multi-command logical units 202a and single command logical units 202b. Then, the communication channel selection program 108A, 108B (FIG. 1) may determine that communication channel A 204a, 204b has a latency of 2 and a slowness factor of 1.5. Furthermore, the communication channel selection program 108A, 108B (FIG. 1) may determine that communication channel B 206a, 206b has a latency of 9 and a slowness factor of 1.0. Also, the communication channel selection program 108A, 108B (FIG. 1) may determine that the multi-command execution base time 208a is 10, the single command execution base time 208b is 40, and the multi-command logical units 202a include 4 commands. As such, the communication channel selection program 108A, 108B (FIG. 1) may calculate "y", or the time it takes to process the communication logical units 214a, 214b, using the expression y=a*(x+b).

Specifically, in the multi-command diagram 200a, and using the expression y=a*(x+b), the communication channel selection program 108A, 108B (FIG. 1) may determine that the time it takes to process the categorized communication logical units 214a is 68 for communication channel A 204a based on the calculation y=((1.5*10)+2)*4, whereby (1.5*10) determines "x". Furthermore, the communication channel selection program 108A, 108B (FIG. 1) may determine that the time it takes to process the categorized communication logical units 214a is 76 for communication channel B 206a based on the calculation y=((1.0*10)+9)*4, whereby (1.0*10) determines "x". Therefore, the communication channel selection program 108A, 108B (FIG. 1) may select communication channel A 204a for the multi-command logical units 202a based on the shorter time it takes to process the categorized communication logical units 214a.

Also, in the single command diagram 200b, and using the expression y=a*(x+b), the communication channel selection program 108A, 108B (FIG. 1) may determine that the time it takes to process the categorized communication logical units 214b is 62 for communication channel A 204b based on the calculation y=40*1.5+2. Furthermore, the communication channel selection program 108A, 108B (FIG. 1) may determine that the time it takes to process the categorized communication logical units 214b is 49 for communication channel B 206b based on the calculation y=40*1.0+9. Therefore, the communication channel selection program 108A, 108B (FIG. 1) may select communication channel B 206b for the single command logical unit 202b based on the shorter time it takes to process the categorized communication logical units 214b.

Figure 3:
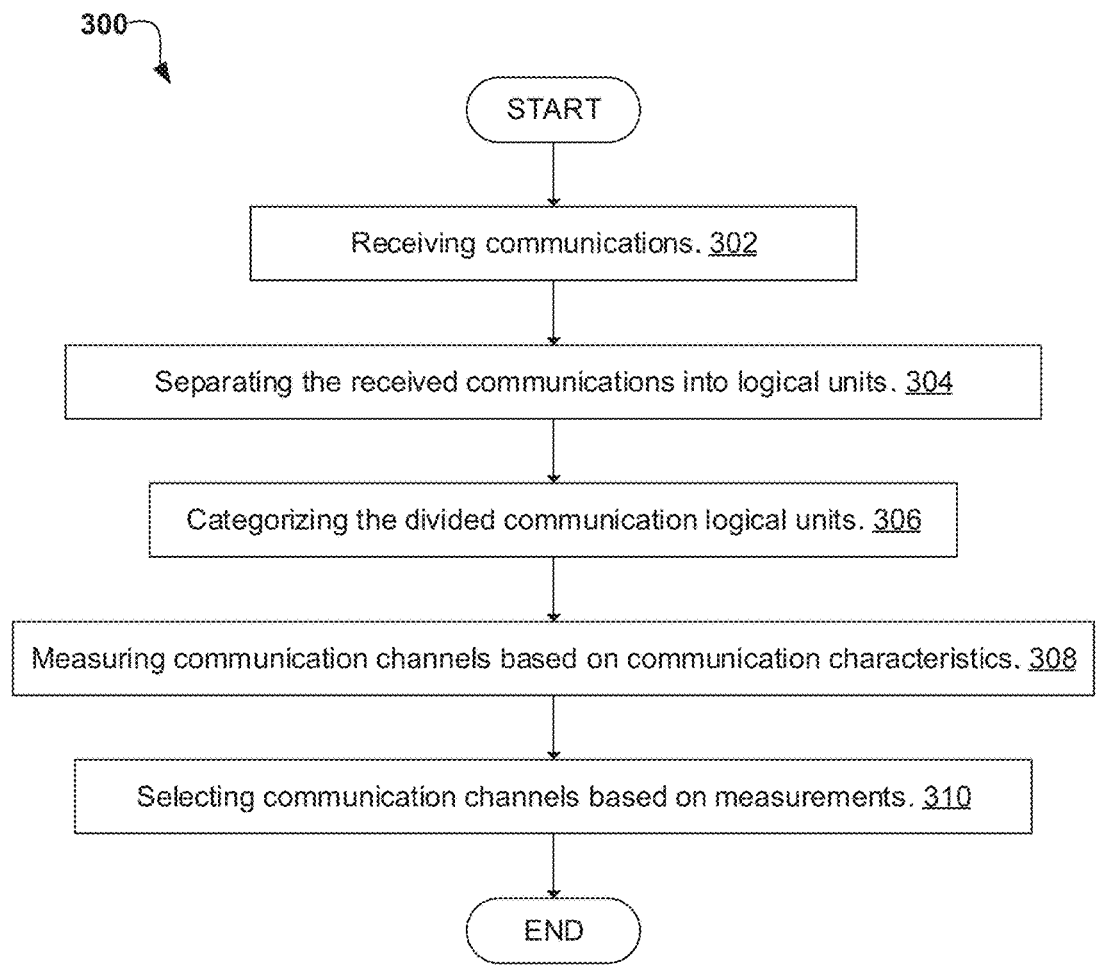
FIG. 3 is an operational flowchart illustrating the steps carried out by a program for selecting communication channels based on communication channel characteristics according to one embodiment.

Referring now to FIG. 3, an operational flowchart 300 that illustrates the steps carried out by a program for selecting communication channels based on different communication channel characteristics in accordance with one embodiment is depicted. At 302, the communication channel selection program 108A, 108B (FIG. 1) may receive communications. For example, and as previously described in FIG. 1, the communication channel selection program 108A, 108B (FIG. 1) may interact with a software program 114 (FIG. 1), such as Firefox®, to receive communications such as http commands that may include http requests.

Then, at 304, the communication channel selection program 108A, 108B (FIG. 1) may separate the received communications into logical units 214a, 214b (FIG. 2). Specifically, the communication channel selection program 108A, 108B (FIG. 1) may separate the received communications into logical units 214a, 214b (FIG. 2) by separating the received communications into sets of commands to be sent and sets of responses to be received. For example, the communication channel selection program 108A, 108B (FIG. 1) may receive communications, such as http commands, and may separate the http commands into logical units 214a, 214b (FIG. 2) that may include sets of http requests to be sent and sets of http responses to be received.

Next, at 306, the communication channel selection program 108A, 108B (FIG. 1) may categorize the communication logical units 214a, 214b (FIG. 2). Specifically, and as previously described in FIG. 2, the communication channel selection program 108A, 108B (FIG. 1) may categorize the communication logical units 214a, 214b (FIG. 2) as multi-command logical units 202a (FIG. 2) and single command logical units 202b (FIG. 2). Furthermore, the communication channel selection program 108A, 108B (FIG. 1) may determine that the single command logical units 202b (FIG. 2) may send only one message or execute one command, while the multi-command logical units 202a (FIG. 2) may send two or more messages/commands to be processed. For, example, the communication channel selection program 108A, 108B (FIG. 1) may categorize communication logical units 214a (FIG. 2), such as a set of http requests, as multi-command logical units 202a (FIG. 2). Furthermore, the communication channel selection program 108A, 108B (FIG. 1) may categorize communication logical unit 214b (FIG. 2), such as one http request, as a single command logical unit 202b (FIG. 2).

Then, at 308, the communication channel selection program 108A, 108B (FIG. 1) may measure the categorized logical units 202a, 202b (FIG. 2). Specifically, and as previously described in FIG. 2, the communication channel selection program 108A, 108B (FIG. 1) may measure the communication channels 204a, 204b, 206a, and 206b (FIG. 2) based on the expression y=a*(x+b), whereby: y=the time required to process a communication logical unit 214a, 214b (FIG. 2); x=the average time to run a single command on a computer depending on information such as the target computer processing power; b=round-trip latency between computers; and a=the number of commands to be processed based on whether synchronous and asynchronous communication channels.

For example, and as previously described in FIG. 2, the communication channel selection program 108A, 108B (FIG. 1) may determine that communication channel A 204a, 204b (FIG. 2) has a latency of 2 and a slowness factor of 1.5. Furthermore, the communication channel selection program 108A, 108B (FIG. 1) may determine that communication channel B 206a, 206b (FIG. 2) has a latency of 9 and a slowness factor of 1.0. Also, the communication channel selection program 108A, 108B (FIG. 1) may determine that the multi-command execution base time 208a (FIG. 2) is 10, the single command execution base time 208b is 40, and the multi-command logical units 202a (FIG. 2) includes 4 commands. As such, the communication channel selection program 108A, 108B (FIG. 1) may calculate "y", or the time it takes to process the communication logical units 214a, 214b (FIG. 2), using the expression $y=a*(x+b)$.

Specifically, in the multi-command diagram 200a (FIG. 2), and using the expression $y=a*(x+b)$, the communication channel selection program 108A, 108B (FIG. 1) may determine that the time it takes to process the categorized communication logical units 214a (FIG. 2) is 68 for communication channel A 204a (FIG. 2) based on the calculation $y=((1.5*10)+2)*4$, whereby (1.5*10) determines "x". Furthermore, the communication channel selection program 108A, 108B (FIG. 1) may determine that the time it takes to process the categorized communication logical units 214a (FIG. 2) is 76 for communication channel B 206a (FIG. 2) based on the calculation $y=((1.0*10)+9)*4$, whereby (1.0*10) determines "x". Therefore, the communication channel selection program 108A, 108B (FIG. 1) may select communication channel A 204a (FIG. 2) for the multi-command logical units 202a (FIG. 2) based on the shorter time it takes to process the categorized communication logical units 214a (FIG. 2).

Also, in the single command diagram 200b (FIG. 2), and using the expression $y=a*(x+b)$, the communication channel selection program 108A, 108B (FIG. 1) may determine that the time it takes to process the categorized communication logical units 214b (FIG. 2) is 62 for communication channel A 204b (FIG. 2) based on the calculation $y=40*1.5+2$. Furthermore, the communication channel selection program 108A, 108B (FIG. 1) may determine that the time it takes to process the categorized communication logical units 214b (FIG. 2) is 49 for communication channel B 206b (FIG. 2) based on the calculation $y=40*1.0+9$. Therefore, the communication channel selection program 108A, 108B (FIG. 1) may select communication channel B 206b (FIG. 2) for the single command logical unit 202b (FIG. 2) based on the shorter time it takes to process the categorized communication logical units 214b (FIG. 2).

Next, at 310, the communication channel selection program 108A, 108B (FIG. 1) may select the communication channel 204a, 204b, 206a, 206b (FIG. 2) based on the measurements. Specifically, the communication channel selection program 108A, 108B (FIG. 1) may select the communication channel 204a, 204b, 206a, 206b (FIG. 2) that takes the shorter amount of time to process the categorized communication logical units 214a, 214b (FIG. 2). As such, based on the previously described measurements at step 308, the communication channel selection program 108A, 108B (FIG. 1) may select communication channel A 204a (FIG. 2) for the multi-command logical units 202a (FIG. 2), and may select communication channel B 206b (FIG. 2) for the single command logical unit 202b (FIG. 2).

It may be appreciated that FIGS. 2 and 3 provide only illustrations of one implementation and do not imply any limitations with regard to how different embodiments may be implemented. Many modifications to the depicted environments may be made based on design and implementation requirements. Specifically, according to one implementation, the communication channel selection program 108A, 108B (FIG. 1) may use variations of the expression $y=a*(x+b)$ to measure the communication channels 204a, 204b, 206a, 206b (FIG. 2). For example, for more precision, the communication channel selection program 108A, 108B (FIG. 1) may use the expression, $y=(x1+b)+(x2+b)+(x3+b)+\ldots$, whereby: y=the time required to process a communication logical unit 214a, 214b (FIG. 2); x=the average time to run a single command on a computer depending on information such as the target computer processing power; and b=round-trip latency between computers.

Figure 4:
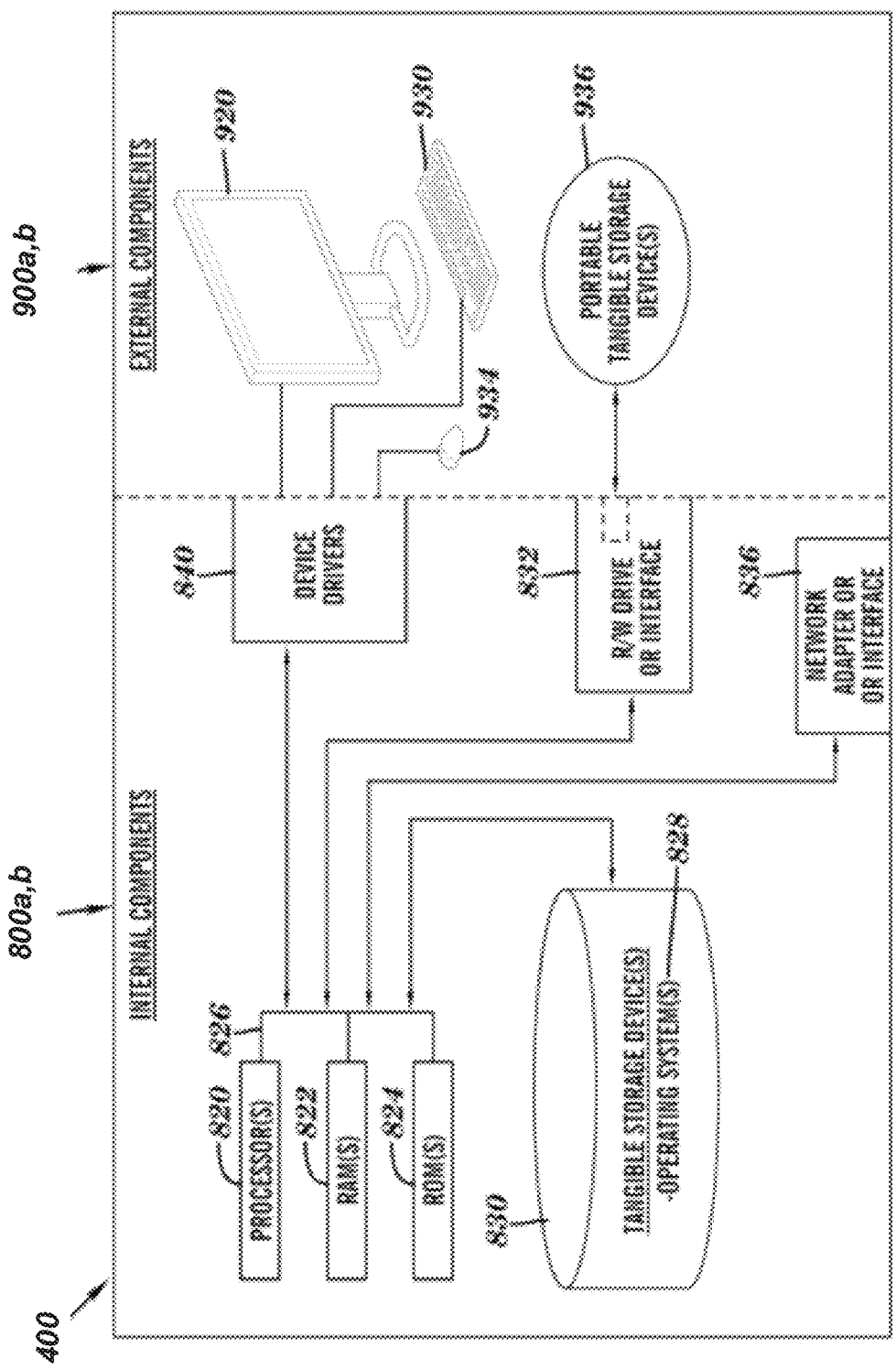
FIG. 4 is a block diagram of the system architecture of a program for determining and providing aggregate functions associated with database tables according to one embodiment.

FIG. 4 is a block diagram 400 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) include respective sets of internal components 800 a, b and external components 900 a, b illustrated in FIG. 4. Each of the sets of internal components 800 a, b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828, the software program 114 (FIG. 1) and the communication channel selection program 108A (FIG. 1) in client computer 102 (FIG. 1), and the communication channel selection program 108B (FIG. 1) in network server computer 112 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 a, b, also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as a communication channel selection program 108A and 108B (FIG. 1), can be stored on one or more of the respective portable computer-readable tangible storage devices 936, read via the respective R/W drive or interface 832 and loaded into the respective hard drive 830.

Each set of internal components 800 a, b also includes network adapters or interfaces 836 such as a TCP/IP adapter cards, wireless Wi-Fi interface cards, or 3G or 4G wireless interface cards or other wired or wireless communication links. The communication channel selection program 108A (FIG. 1) and software program 114 (FIG. 1) in client computer 102 (FIG. 1), and the communication channel selection program 108B (FIG. 1) in network server 112 (FIG. 1) can be downloaded to client computer 102 (FIG. 1) from an external computer via a network (for example, the Internet, a local area network or other, wide area network) and respective network adapters or interfaces 836. From the network adapters or interfaces 836, the communication channel selection program 108A (FIG. 1) and software program 114 (FIG. 1) in client computer 102 (FIG. 1) and the communication channel selection program 108B (FIG. 1) in network server computer 112 (FIG. 1) are loaded into the respective hard drive 830. The network may comprise copper wires, optical fibers, wireless transmission, routers, firewalls, switches, gateway computers and/or edge servers.

Each of the sets of external components 900 a, b can include a computer display monitor 920, a keyboard 930, and a computer mouse 934. External components 900 a, b can also include touch screens, virtual keyboards, touch pads, pointing devices, and other human interface devices. Each of the sets of internal components 800 a, b also includes device drivers 840 to interface to computer display monitor 920, keyboard 930, and computer mouse 934. The device drivers 840, R/W drive or interface 832, and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
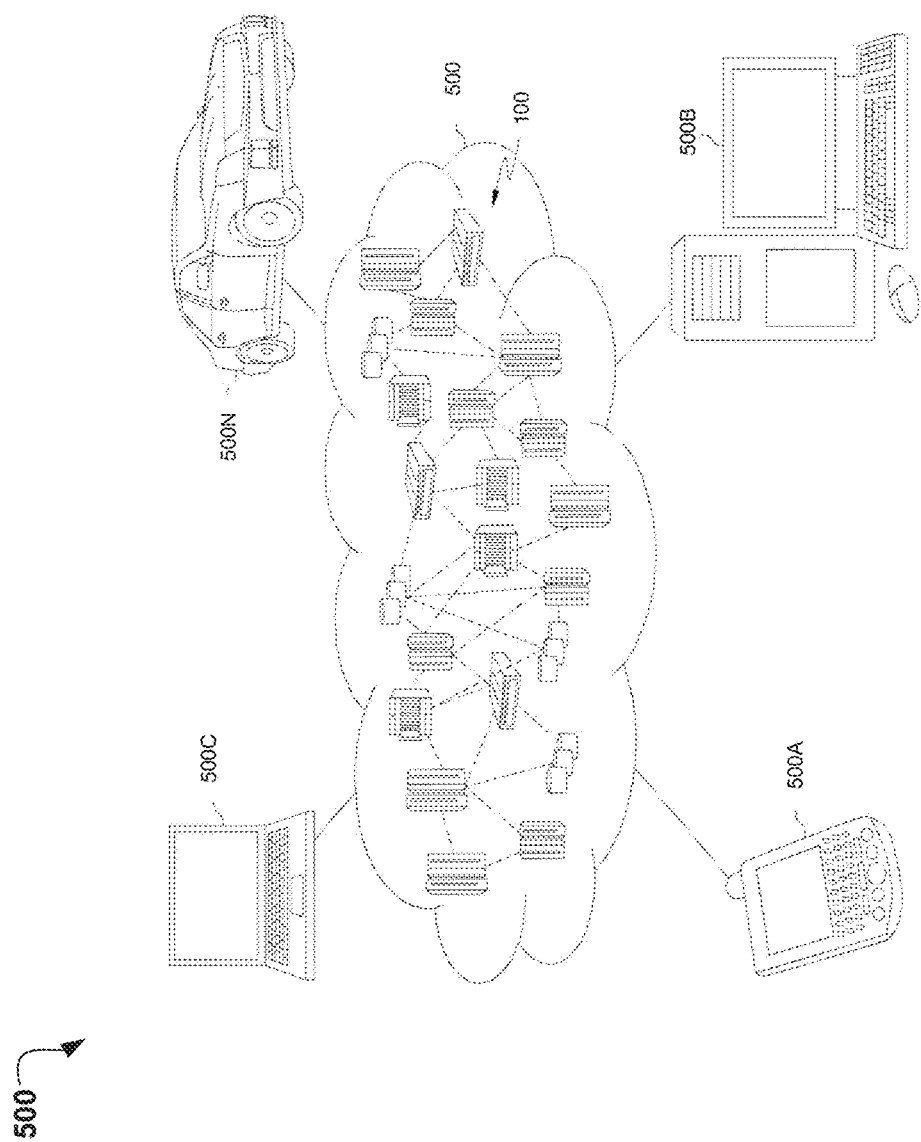
FIG. 5 is a block diagram of an illustrative cloud computing environment including the computer system depicted in FIG. 1, in accordance with an embodiment of the present disclosure.

Referring now to FIG. 5, illustrative cloud computing environment 500 is depicted. As shown, cloud computing environment 500 comprises one or more cloud computing nodes 100 with which local computing devices used by cloud consumers, such as, for example, personal digital assistant (PDA) or cellular telephone 500A, desktop computer 500B, laptop computer 500C, and/or automobile computer system 500N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 500A-N shown in FIG. 5 are intended to be illustrative only and that computing nodes 100 and cloud computing environment 500 can communicate with any type of computerized device over any type of network and/or network addressable connection (e.g., using a web browser).

Figure 6:
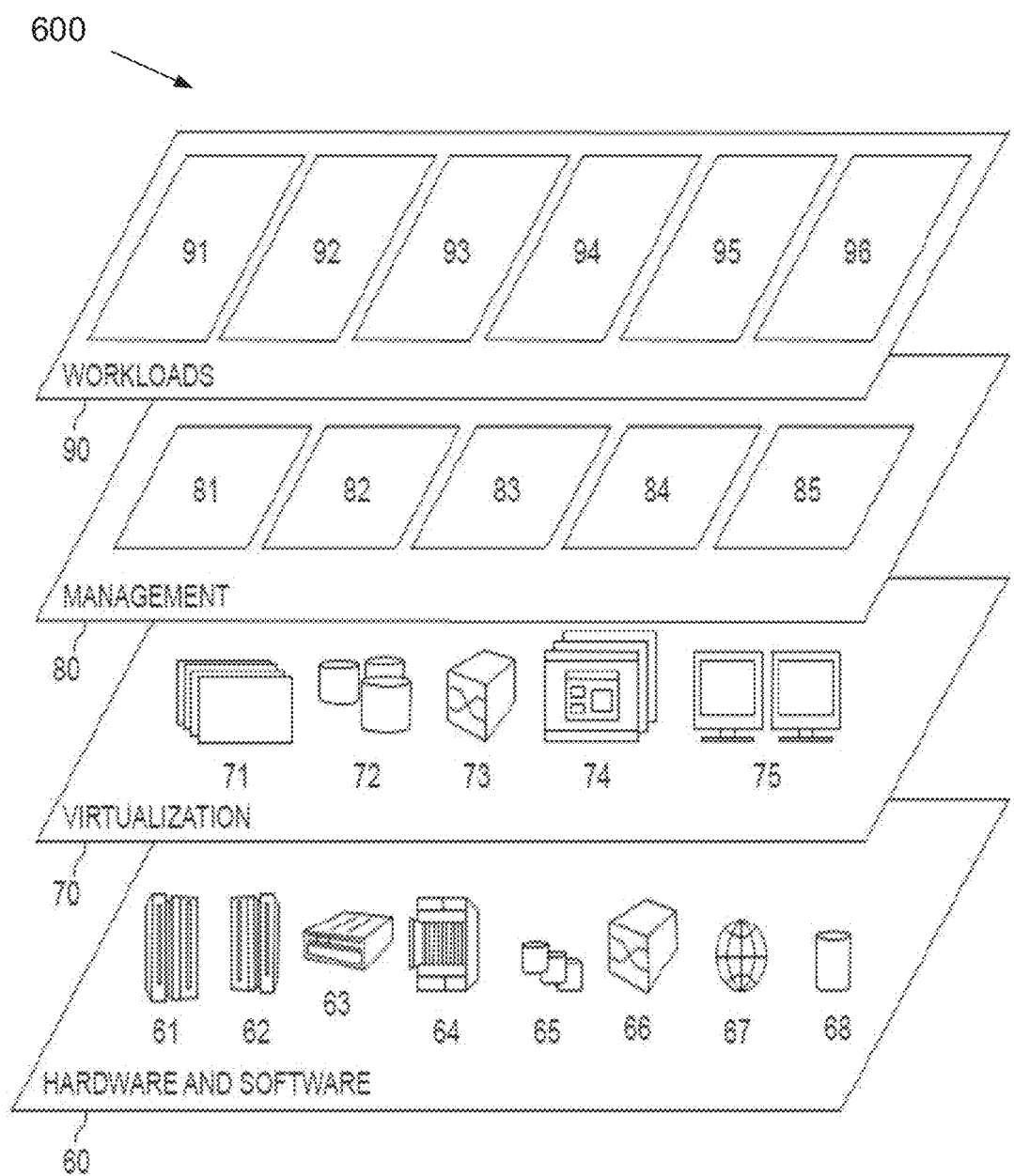
FIG. 6 is a block diagram of functional layers of the illustrative cloud computing environment of FIG. 5, in accordance with an embodiment of the present disclosure.

Referring now to FIG. 6, a set of functional abstraction layers 600 provided by cloud computing environment 500 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components.

Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and communication channel selection 96. A communication channel selection program 108A, 108B (FIG. 1) may be offered "as a service in the cloud" (i.e., Software as a Service (SaaS)) for applications running on mobile devices 102 (FIG. 1) and may select communication channels based on communication channel characteristics.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for selecting at least one communication channel based on a plurality of communication channel characteristics, the method comprising: receiving a plurality of communications, wherein the plurality of communications comprises hypertext transfer protocol requests (HTTP) commands; separating the received plurality of communications into a plurality of units, wherein the plurality of units comprises a command execution base time and an extended command execution time due to slowness; categorizing the plurality of units as single command logical units and multi-command logical units; measuring a plurality of communication channels for the single command logical units and the multi-command logical units based on a time required to process a unit associated with the single command logical units and the multi-command logical units, an average time to run a single command associated with the HTTP commands for the single command logical units and the multi-command logical units, and round-trip latency between computers; and based on the measured plurality of communication channels, selecting the at least one communication channel for the single command logical units and the at least one communication channel for the multi-command logical units.

2. The method of claim 1, wherein categorizing the plurality of units further comprises:
   categorizing the plurality of units comprising one command the single command units, and categorizing the plurality of units comprising at least two commands as the multi-command units.

3. The method of claim 1, wherein measuring the plurality of communication channels further comprises:
   determining a plurality of communication channel processing times associated with the plurality of communication channels.

4. The method of claim 1, wherein the average time is further based on a slowness factor associated with the plurality of communication channels.

5. The method of claim 3, wherein selecting the at least one communication channel is based on the determined plurality of communication channel processing times.

6. The method of claim 1, further comprising:
presenting a plurality of communication channel diagrams associated with the plurality of communication channel characteristics.

7. A computer system for selecting at least one communication channel based on a plurality of communication channel characteristics, comprising: one or more processors, one or more non-transitory computer-readable memories, one or more non-transitory computer-readable tangible storage devices, and program instructions stored on at least one of the one or more storage devices for execution by at least one of the one or more processors via at least one of the one or more memories, wherein the computer system is capable of performing a method comprising: receiving a plurality of communications, wherein the plurality of communications comprises hypertext transfer protocol requests (HTTP) commands; separating the received plurality of communications into a plurality of units, wherein the plurality of units comprises a command execution base time and an extended command execution time due to slowness; categorizing the plurality of units as single command logical units and multi-command logical units; measuring a plurality of communication channels for the single command logical units and the multi-command logical units based on a time required to process a unit associated with the single command logical units and the multi-command logical units, the average time to run a single command associated with the HTTP commands for the single command logical units and the multi-command logical units, and round-trip latency between computers; and based on the measured plurality of communication channels, selecting the at least one communication channel for the single command logical units and the at least one communication channel for the multi-command logical units.

8. The computer system of claim 7, wherein categorizing the plurality of units further comprises:
categorizing the plurality of units comprising one command as the single command units, and categorizing the plurality of units comprising at least two commands as the multi-command units.

9. The computer system of claim 7, wherein measuring the plurality of communication channels further comprises:
determining a plurality of communication channel processing times associated with the plurality of communication channels.

10. The computer system of claim 7, wherein the average time is further based on a slowness factor associated with the plurality of communication channels.

11. The computer system of claim 7, wherein selecting the at least one communication channel is based on the determined plurality of communication channel processing times.

12. The computer system of claim 11, further comprising:
presenting a plurality of communication channel diagrams associated with the plurality of communication channel characteristics.

13. A computer program product for selecting at least one communication channel based on a plurality of communication channel characteristics, comprising: one or more non-transitory computer-readable storage devices and program instructions stored on at least one of the one or more tangible storage devices, the program instructions executable by a processor, the program instructions comprising: program instructions to receive a plurality of communications, wherein the plurality of communications comprises hypertext transfer protocol requests (HTTP) commands; program instructions to separate the received plurality of communications into a plurality of units, wherein the plurality of units comprises a command execution base time and an extended command execution time due to slowness; program instructions to categorize the plurality of units as single command logical units and multi-command logical units; program instructions to measure a plurality of communication channels for the single command logical units and the multi-command logical units based on a time required to process a unit associated with the single command logical units and the multi-command logical units, the average time to run a single command associated with the HTTP commands for the single command logical units and the multi-command logical units, and round-trip latency between computers; and based on the measured plurality of communication channels, program instructions to select the at least one communication channel for the single command logical units and the at least one communication channel for the multi-command logical units.

14. The computer program product of claim 13, wherein the program instructions to categorize the plurality of units further comprises:
program instructions to categorize the plurality of units comprising one command as the single command units, and program instructions to categorize the plurality of units comprising at least two commands as the multi-command units.

15. The computer program product of claim 13, wherein the program instructions to measure the plurality of communication channels further comprises:
program instructions to determine a plurality of communication channel processing times associated with the plurality of communication channels.

16. The computer program product of claim 13, wherein the average time is further based on a slowness factor associated with the plurality of communication channels.

17. The computer program product of claim 16, wherein the program instructions to select the at least one communication channel is based on the determined plurality of communication channel processing times.

\* \* \* \* \*